United States Patent [19]

Brown et al.

[11] Patent Number: 4,604,500

[45] Date of Patent: Aug. 5, 1986

[54] MULTIPROCESSING INTERRUPT ARRANGEMENT

[75] Inventors: Sanford S. Brown, River Plaza; Dennis J. Hunsberger, Lincroft; Michael R. Lundberg, Bridgewater, all of N.J.

[73] Assignee: AT&T Bell Laboratories, Murray Hill, N.J.

[21] Appl. No.: 326,908

[22] Filed: Dec. 2, 1981

[51] Int. Cl.[4] .............................................. G06F 9/00
[52] U.S. Cl. ............................................... 179/18 ES
[58] Field of Search ............................. 364/200, 900; 179/18 ES

[56] References Cited

U.S. PATENT DOCUMENTS

| | | | |
|---|---|---|---|
| 4,015,243 | 3/1977 | Kurpanek et al. | 364/200 |
| 4,271,468 | 6/1981 | Christensen et al. | 364/200 |
| 4,320,451 | 3/1982 | Bachman et al. | 364/200 |
| 4,323,967 | 4/1982 | Peters et al. | 364/200 |
| 4,414,624 | 11/1983 | Summer et al. | 364/200 |
| 4,420,806 | 12/1983 | Johnson et al. | 364/200 |
| 4,424,561 | 1/1984 | Stanley | 364/200 |

*Primary Examiner*—Gareth D. Shaw
*Assistant Examiner*—John G. Mills
*Attorney, Agent, or Firm*—David H. Tannenbaum

[57] ABSTRACT

There is disclosed an interrupt arrangement for use in a multiprocessing system where it is desired to specifically direct interrupts from one processor to any other processor. The arrangement treats the interrupt signal as a data communication between processors. In this regard, common address space is set aside, on a system basis, for interrupt signals. A sending processor first contends for the system bus and then addresses a message to a specific target processor. The message is received at the target processor over the regular communication channel and stored in a FIFO memory. Interrupt messages filter through the memory in order of arrival and cause interrupts to occur at the target processor. The information at the output of the FIFO memory controls the processing of the interrupt.

13 Claims, 3 Drawing Figures

ADDRESS SPACE WITHIN SHARED MEMORY 13, 23, 33, 43

MULTIPROCESSING INTERRUPT ARRANGEMENT

BACKGROUND OF THE INVENTION

This invention pertains to a multiprocessing interrupt arrangement which eliminates the need for hardwired interrupt signaling paths between processors and also eliminates special bus cycles for sending interrupts between processors.

Multiprocessing has become a standard technique in telephone and computing systems for allowing a large number of independent processes to occur simultaneously, each having minimal need to communicate with the other. In such multiprocessing systems problems exist in that it is often necessary to have one independent processor interrupt another one of the processors in the network. Such interrupts are used, for example, to change the task of the other processor.

Three basic approaches are presently being used. These are (1) fully interconnected network of interrupts, (2) unique system bus cycles, and (3) polling of flags in local memory.

In the first arrangement, there is a unique interrupt signal from each processor in the network to the other processors. For large systems the number of interrupt connections becomes unwieldy. The second approach requires additional signal paths between processors to distinguish interrupt cycles from normal memory transfer cycles. The third approach requires each processor to regularly poll specific memory locations to ascertain whether or not it has been interrupted.

SUMMARY OF THE INVENTION

There is proposed an interrupt scheme which treats the interrupt signals between processors as data thereby allowing the interrupt information to be conveyed during the standard system bus data read and write cycles. Usng this approach, it is possible to send interrupt messages to selected other processors with the message containing, for example, the source identity of the sending processor, as well as the interrupt type.

Servicing sequential interrupts from multiple sources is made possible by a hardware FIFO register located at each processor location, the function of which is to queue the received interrupt messages and to provide an actual interrupt signal to the locally associated processor.

A sending processor uses the system communication bus and addresses the interrupt FIFO associated with a particular target processor. An interrupt message is then passed to the FIFO over the regular system data communication path. When the message arrives at the output register of the FIFO, a signal is sent to the processor. The processor then retrieves the data stored in the FIFO output register. The data could contain all of the information needed by the processor, or the data could point to a location within a local memory, which location is set aside on a systemwide basis. Using this arrangement the memory location would contain the data to be used by the processor for interrupt processing.

BRIEF DESCRIPTION OF THE DRAWING

The solution to the foregoing problems, together with the operation and utilization of the present invention, will be more fully apparent from the following description taken in conjunction with the drawing, in which.

GENERAL DESCRIPTION—OVERALL OPERATION

Figure 1:
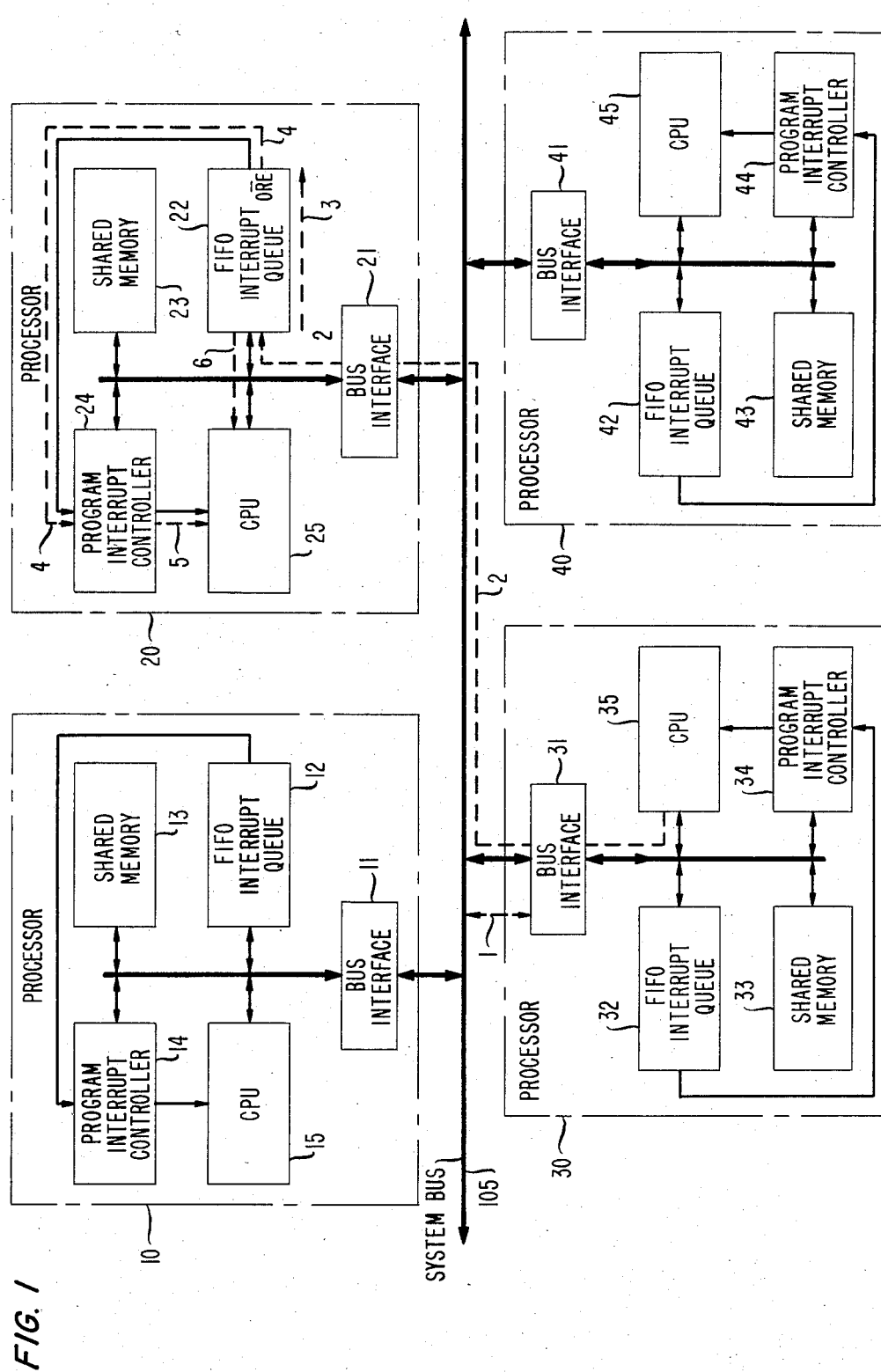
FIG. 1 shows an overall system diagram of a multiprocessor system.

As shown in FIG. 1, there are a number of individual processors 10, 20, 30, 40, each capable of independently functioning to perform processes based on information data provided over system bus 105.

Figure 2:
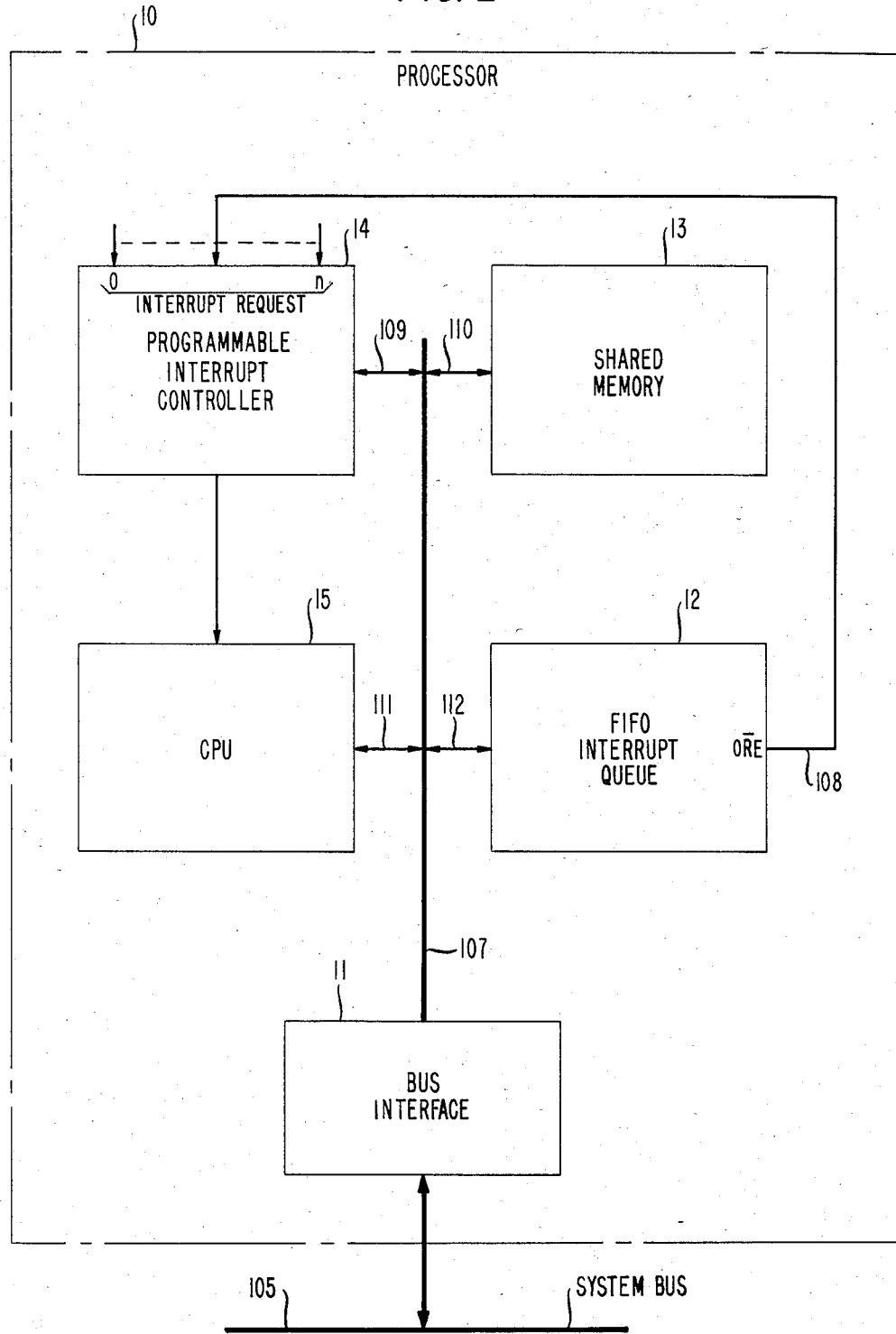
FIG. 2 shows an expanded diagram of one of the processor modules connected to the system.

Before entering upon a discussion of the operation of the interrupt scheme a review of the operation and building blocks of each processor will be helpful. In this regard, FIG. 2 shows bus interface 11 which operates to move data to and from system bus 105. This interface is adapted to solve contention problems so that more than one processor is not sending data to the bus at the same time. Such an interface may be of the type shown in *Intel Multibus Interfacing*, Intel publication No. 9800587A. Other arrangements, of course, may be used to insure that contentions are resolved between multiprocessors vying for the common bus. Bus interface 11 also provides address decoding so that data destined for the associated processor may be removed from the bus and properly stored.

CPU 15 may be any type of processor designed to do any type of process function. One example would be the INTEL 8086 microprocessor. Shared memory 13 may be any type of random access memory, such as Mostek MK 4802. Programmable interrupt controller 14 may be an INTEL 8259A which serves to receive an interrupt signal and to process that signal in a particular manner to cause CPU 15 to cease, as soon as is reasonable, from the task it was processing and to process the interrupt. FIFO interrupt queue 12 may be a Fairchild 9403 which is a First-In-First-Out memory. Processor 10, shown in FIG. 2, can also be, for example, an INTEL iSBC 86/12A Single Board Computer with the addition of the FIFO interrupt queue with appropriate address decoding for the FIFO.

Digressing momentarily, and returning to FIG. 1, it can clearly be seen that there is no provision made for hardwiring the various processors for interrupt signaling as is the situation in the prior art, as for example, the arrangement shown in the Intel Multibus Specification. Thus, because of this arrangement, any number of processors may be added or removed from the bus with only an assignment of memory space.

Figure 3:
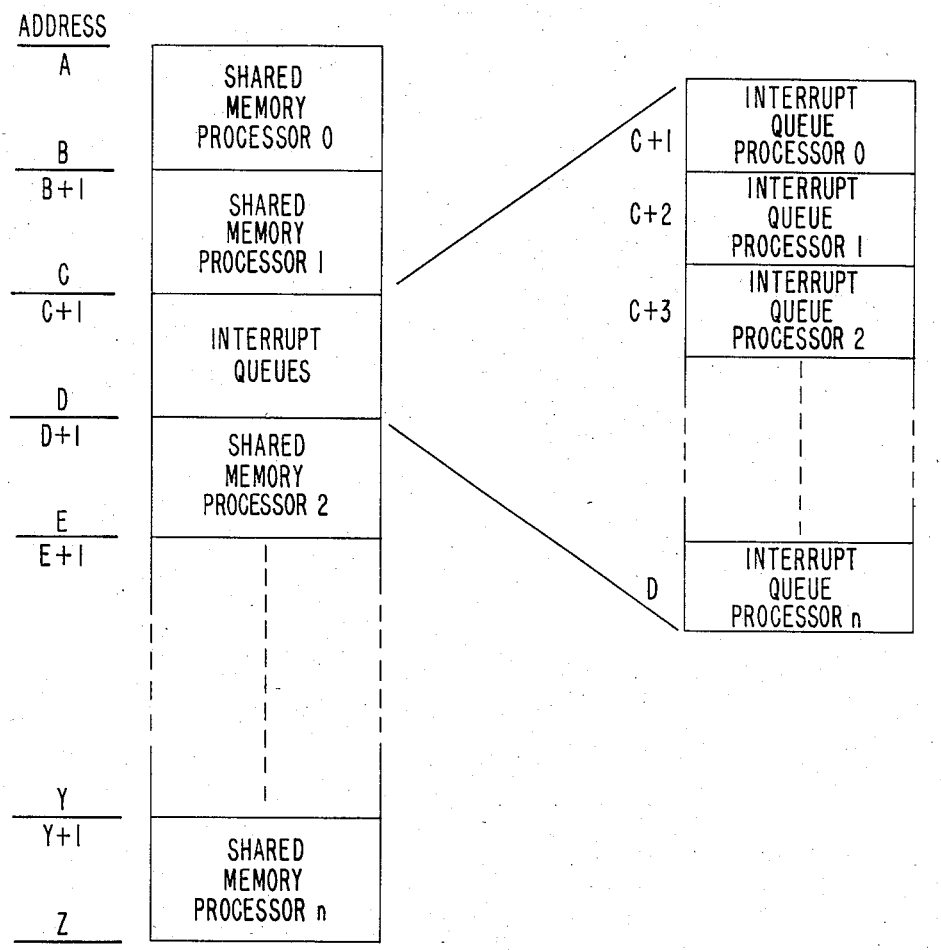
FIG. 3 shows an arrangement of the memory space of the multiprocessing system.

As shown in FIG. 3, the system has memory space assigned on a systemwide basis and set aside for processing the interrupts. Each processor has an identifiable FIFO address location within its local memory and this space is accessible by all of the processors. One advantage of such an arrangement is that the local memory may be addressed by any other processor and information may be retrieved from the local memory pertaining, for example, uniquely to the sending processor. Thus, the sending processor need not "know" anything about the target processor other than the system memory map in order to send interrupt messages. This arrangement therefore provides one level of indirection. This operation will be detailed more fully hereinafter.

In FIG. 3 the interrupt information is shown represented by location C+1 to D in the shared memory space. Thus, the memory mapped addressing scheme used by the system bus allows any processor to share part or all of its local resources with other system bus masters. This approach provides uniform resource addressing across the network, since processors address remote resources just as they would their local memory.

GENERAL DESCRIPTION—INTERRUPT MECHANISM

As shown in FIGS. 1 and 3, the FIFO associated with each microprocessor is part of that processor's shared resources, accessible by all other processors. Asynchronous hardware and software interrupts are transmitted over system bus 105 through the use of these FIFOs. For interrupt operation, the source processor writes an interrupt vector (which describes the type of interrupt) into the FIFO of the desired target processor. This vector is queued behind other interrupt vectors priorly sent to the target processor. These vectors fall through the FIFO and, one by one, interrupt the target processor in a manner determined first by the Programmable Interrupt Controller and second by the controlling vector at the output of the FIFO.

The system bus arbitration mechanism, bus interface 11, 21, 31, 41, serializes interrupt requests from the multiple sources and FIFOs 12, 22, 32, 42, provide the buffering required to hold the pending vectors until the processor can service them. The depth and width of each FIFO is a design choice with the depth being governed by the number of outstanding interrupts each processor in the system may have and the width governed either by the number of distinct interrupt types to be serviced by a processor or by the number of information bits on the system bus.

This aproach to handling interrupts utilizes available system bus resources without special bus interrupt signals or bus cycles. If the target processor's interrupt queue is full, a bus error will occur informing the source that the interrupt was not delivered. Re-tries are administered by software in the source processor. Since hardwiring is not necessary, processors may be added or removed without difficulty.

DETAILED DESCRIPTION

For illustration purposes, a specific example will be detailed where processor 30 interrupts processor 20. This illustration is keyed to the broken lines in FIG. 1 where:

(1) processor 30 acquires bus 105;

(2) source processor 30 delivers n bits of data (representing the interrupt vector) to the interrupt queue of target processor 20. The actual transfer of data is done with a memory write cycle under control of processor 30;

(3) the interrupt vector is stored in FIFO 22 of target processor 20;

(4) The stored interrupt vector falls through interrupt queue 22 and a signal representing that fact is delivered via the output register not empty ($\overline{ORE}$) signal, to programmable interrupt controller (PIC) 24.

(5) The PIC, using its preprogrammed masks and priorities, delivers an interrupt signal to CPU 25.

(6) CPU 25, under control of the interrupt signal, reads the interrupt vector from interrupt queue 22 and services that interrupt.

One alternative to step (6) above is that the vector contained in the FIFO, instead of containing the actual interrupt control information, may point to a specific location within the shared memory. In such a situation, sending processor 30 would provide an address location in the target shared memory pertaining to information uniquely associated with the sending processor. This location then would contain the information pertaining to the actual interrupt.

The shared memories of all processors could also be arranged with a common set of interrupt control messages. In such a situation, the sending processor need only send the address location of the desired interrupt type. The target processor would then, under control of the information provided in the FIFO, address the local memory and perform the interrupt in accordance with the information priorly stored therein at the designated address. As discussed priorly, the reason that this can be achieved is that the system as a whole shares address space and thus, with respect to a given interrupt, the same vector (interrupt message) can be delivered to any processor.

SUMMARY

Using the above-described interrupt arrangement, the CPU need not continually use process time to interrogate a flag bit to determine if an interrupt signal is awaiting processing, since the actual interrupt signal is affirmatively applied to the CPU via the FIFO only when an interrupt vector is present. Since the memory is shared in common, it is possible to send messages which are longer than would otherwise be sent during a single cycle, since the sent message may contain the address of locally stored data, which data, if transmitted from the sending processor would require more than one such cycle.

The FIFO serves as a queue to receive and store many interrupt messages from many processors. Typically, the system would be arranged to handle only one such interrupt from each sending processor at a time, allowing the sending processor to then deal with subsequent interrupts to be sent to the same target processor. In such a system, the FIFO then need only contain enough length to handle one interrupt from each other processor. However, it certainly is possible to allow multiple interrupts from the same processor, simply by making the FIFO longer. Also, it is possible to prioritize the interrupts, depending upon a number of factors, such as the interrupt type, the sending processor, etc. This can be accomplished by arranging a number of FIFO registers with the interrupt message either directly addressed to a particular one of the FIFOs or by using stored program control to sort out the interrupts as they arrive. Once the input vector is stored in a particular FIFO, the outputs from the FIFOs would be provided to the CPU on some type of priority arrangement, the simplest such arrangement being to empty one FIFO before looking for vectors in another FIFO. Another arrangement would be to use the shared memory and the processor together to determine which interrupt must be serviced next.

CONCLUSION

It is also obvious that, while our multiprocessor interrupt system is shown in a hardwired local bus arrangement, there is no practical limitation on how the processors may be interconnected, and this interconnection could span large geographical areas, with the only requirement being that the source processor must be able to direct interrupt information to the target processor's interrupt queue.

What is claimed is:

1. An interrupt system for use with each processor of a multiprocessor communication or telephone network, where one processor may request actions of another responding processor independent of the state of the other processors, said system comprising means including a FIFO memory for queuing interrupt vector messages directed from a requesting processor to a particular other responding processor and received via said network directly from said requesting processor without intervention by any other processor, and means controlled only by said responding processor for sequentially providing to said directed processor an interrupt signal for each said queued vector message.

2. The invention set forth in claim 1 wherein each said interrupt vector message is communicated over said network using the same media and same protocol as used by other data which is communicated between said processors.

3. The invention set forth in claim 2 wherein said provided interrupt vector messages from said FIFO queue are used to indicate to said processor functions which said processor shall perform.

4. The invention set forth in claim 2 wherein said arrangement further includes means, including a memory having address locations therein shared in common by all of said processors, for storing information pertaining to interrupt tasks, said means addressable by a receiving processor based upon the receiving processor's interpretation of the interrupt vector messages queued in said FIFO.

5. An interrupt system for use in conjunction with each processor of a multiprocessor communication or telephone system where information is communicated between sending and receiving processors via a communication medium, said system comprising a CPU within each said processor for controlling the processes running at said processor, characterized in that there is provided at each said processor a FIFO memory for receiving vector messages directed to said CPU of a receiving processor over said communication medium directly from a sending processor without intervention by any other processor, means at said receiving processor, including an output register associated with said FIFO, and including an interrupt controller, for providing interrupt messages to said receiving processor's CPU, and means at said receiving processor for providing to said CPU the received vector messages associated with said provided interrupt messages.

6. The invention set forth in claim 5 wherein said controller also includes a memory having address space therein shared in common by all said processors, and means at said receiving processor for controlling said interrupt processing by utilizing said received vector messages in conjunction with information stored in said memory.

7. The invention set forth in claim 6 wherein said interrupt vector message is stored in said FIFO in the order received and passed to said receiving processor in said order, said arrangement further comprising means in said receiving processor for prioritizing said vector messages dependent upon the information content of said vector messages.

8. A multiprocessing communication or telephone system where information is communicated between service requesting and service providing processors via a communication medium, each said processor comprising a CPU for controlling the processes running at said processor, a FIFO memory for receiving vector messages directed to said processor over said communication medium, said vector messages communicated directly from a service requesting processor to said processor without intervention by any other processor, and wherein said service providing processor comprises means, including an output register associated with said FIFO, and including an interrupt controller, for providing an interrupt signal to said CPU and means for providing to said CPU the received vector messages associated with said provided interrupt signal.

9. The invention set forth in claim 8 wherein said vector messages are communicated between processors using the same media and same protocol as used by other data which is communicated between said processors.

10. A system for controlling interrupts between processors of a multiprocessor communication or telephone system where information is communicated between processors via a communication medium, said system comprising means for communicating from a sending processor to a target processor over said communication medium an interrupt vector message during one write cycle of said sending processor said communication being direct from said sending processor to said target processor without means at said target processor for controlling interrupts thereat, means for storing said interrupt vector message in a FIFO queue at said target processor, and means including said FIFO queue and said interrupt controlling means at said target processor for sequentially providing to said target processor an interrupt signal for each said queued interrupt vector message.

11. The invention set forth in claim 10 wherein said sequentially providing means includes means for reading from said FIFO under control of said target processor the interrupt vector message stored in said FIFO associated with each said interrupt signal.

12. The method of controlling interrupts between processors of a multiprocessor communication or telephone system where information is communicated between processors via a communication medium, the method of controlling interrupts between processors comprising the steps of communicating directly from a sending processor to a target processor over said communication medium an interrupt vector message during one write cycle of said sending processor, storing said interrupt vector message in a FIFO queue at said target processor, and sequentially providing to said target processor under control of an interrupt controller at said target processor an interrupt signal for each said queued interrupt vector message.

13. The invention set forth in claim 12 further comprising the steps of reading from said FIFO under control of said interrupt controller the interrupt vector message stored in said FIFO associated with each said interrupt signal.

* * * * *